United States Patent
Ahluwalia et al.

[11] Patent Number: 5,225,467
[45] Date of Patent: Jul. 6, 1993

[54] CELLULOSE ESTER RESIN STABILIZER AND CELLULOSE ESTER RESIN COMPOSITIONS STABILIZED THEREWITH

[75] Inventors: Surinder Ahluwalia, Sugar Land, Tex.; Michael H. Fisch, Wayne; R. David Peveler, Woodcliff Lake, both of N.J.

[73] Assignee: Witco Corporation, New York, N.Y.

[21] Appl. No.: 786,381

[22] Filed: Nov. 1, 1991

[51] Int. Cl.$^5$ .................. C08K 5/521; C08K 5/15
[52] U.S. Cl. .................... 524/120; 524/109
[58] Field of Search .................... 529/109, 120

[56] References Cited

U.S. PATENT DOCUMENTS

| | | | |
|---|---|---|---|
| 2,065,125 | 12/1936 | Dreyfuss | 524/109 |
| 2,822,368 | 2/1958 | Rowland et al. | 524/109 |
| 2,826,592 | 3/1958 | Mueller et al. | 524/109 |
| 2,834,798 | 5/1958 | Hechenbleikner et al. | 558/78 |
| 3,047,415 | 7/1962 | Rhodes et al. | 524/109 |
| 3,047,608 | 7/1962 | Friedman et al. | 558/78 |
| 4,076,686 | 2/1978 | Calkins | 524/109 |
| 4,220,472 | 9/1980 | Mauric et al. | 524/120 |

*Primary Examiner*—Kriellion S. Morgan
*Attorney, Agent, or Firm*—Lockwood, Alex, FitzGibbon & Cummings

[57] ABSTRACT

Nonylphenyl neopentylene phosphite, or stated in terms of systematic nomenclature 5,5-dimethyl-2-nonylphenoxy-1,3,2-dioxaphosphorinane, compositions effective to stabilize cellulose ester resins against the degradative effects of heat and processing are disclosed. In accordance with the present invention, preferred stabilizing compositions for cellulose ester resins include nonylphenyl neopentylene phosphite in combination with epoxidized linseed oil. These stabilizing compositions demonstrate their stabilizing effectiveness by maintaining the melt viscosity of the polymer during hot working and minimizing discoloration of the polymer when heated.

18 Claims, 4 Drawing Sheets

Cellulose Acetate

Cellulose Acetate Propionate

Cellulose Acetate Butyrate

CELLULOSE ESTER RESIN STABILIZER AND CELLULOSE ESTER RESIN COMPOSITIONS STABILIZED THEREWITH

BACKGROUND OF THE INVENTION

The present invention relates to stabilizer compositions for cellulose ester resin compositions and to cellulose ester resin compositions having improved resistance to degradation caused by heat. More particularly, the present invention relates to resin compositions containing organic acid esters of cellulose as a resin component and a stabilizer comprising nonylphenyl neopentylene phosphite as a stabilizer to improve the melt viscosity of the polymer during hot working and to minimize discoloration of the polymer when heated.

Numerous references disclose the preparation of phosphite esters and/or the use of phosphites to stabilize cellulose esters. For example, U.S. Pat. No. 2,834,798 is directed to novel phosphites and to methods of preparing phosphites. According to the '798 patent, such phosphites are effective plasticizers and stabilizers for vinyl chloride resins and other plastics.

U.S. Pat. No 3,047,608 discloses processes for the preparation of phosphite esters. According to the '608 patent, phosphite esters can be prepared by transesterification of certain aromatic phosphites with a desired alcohol in the presence of certain phosphite catalysts. The use of these phosphites and other phosphorous compounds to stabilize solid mono alfa olefin polymers is disclosed in U.S. Pat. No. 3,454,521.

U.K. Patent Specification No. 996,254 is directed to cellulose ester compositions containing certain neopentyl phosphites. According to the '254 patent, cellulose esters incorporating such neopentyl phosphites may be stabilized and offer appreciable resistance to color formation when exposed to heat.

U.S. Pat. No. 4,137,201 is directed to a thermal stabilizer system for cellulose esters. According to the '201 patent, a stabilizer system is provided for cellulose esters which comprises at least one cyclic phosphonite compound of a specified formula, a conventional antioxidant and an acid accepting epoxy compound.

U.S. Pat. No. 4,209,340 is directed to providing a cellulose organic acid ester composition comprising a cellulose organic acid ester and incorporating therein certain organic phosphite compounds to stabilize the resin against discoloration and degradation of physical properties caused by the influence of heat. According to the '340 patent, the organic phosphite compounds disclosed therein are effective to stabilize the resin against discoloration during hot molding and have a reduced tendency to promote reduction of the degree of polymerization but do not exhibit a substantial activity of improving the heat resistance or preventing oxidative degradation of the resin. Accordingly, the '340 patent suggests the use of known thermal stabilizers and antioxidants such as epoxy compounds, thioethers, phenol compounds and amine compounds in combination with the organic phosphite compound.

U.S. Pat. No. 4,357,168 which is a continuation-in-part of U.S. Pat. No. 4,256,505, is directed to cellulosic compositions comprising a cellulose ester or a cellulose ether, a surfactant and a heat stabilizer and optionally an oil extender. The '168 patent discloses cellulose ester formulations which include, among other components, a phosphite heat stabilizer and epoxidized soy bean oil.

U.S. Pat. No. 4,882,374 is directed to certain dioxaphosphorinane compounds and polyolefin materials stabilized therewith. According to the '374 patent, polyolefin materials, such as polypropylene which incorporate certain cyclic phosphites are stabilized against thermally-induced oxidative degradation.

A review of the above-mentioned patents and other literature directed to attempts to provide phosphites capable of stabilizing resins against degradation from heat, indicates there is still a need to provide a stabilizer composition which will increase the stability of resins, particularly cellulose ester resins, with respect to process and heat degradation.

Accordingly, it is general object of the present invention is to provide a stabilizer composition for cellulose carboxylic acid esters.

It is another object of the present invention to provide a method of stabilizing cellulose ester polymer resin compositions against heat degradation.

It is a further object of the present invention to provide novel stabilized cellulose ester polymers.

These and other objects of the present invention will be apparent to those skilled in the art from the following description.

SUMMARY OF THE INVENTION

It has now been found that nonylphenyl neopentylene phosphite, or stated in terms of systematic nomenclature 5,5-dimethyl-2-nonylphenoxy-1,3,2-dioxaphosphorinane, provides effective stabilization of cellulose ester resins against the degradative effects of heat and processing. In accordance with the present invention, preferred stabilizing compositions for cellulose ester resins include nonylphenyl neopentylene phosphite in combination with epoxidized linseed oil. These stabilizing compositions demonstrate their stabilizing effectiveness by maintaining the melt viscosity of the polymer during hot working and minimizing discoloration of the polymer when heated.

DETAILED DESCRIPTION OF THE INVENTION

Figure 1:
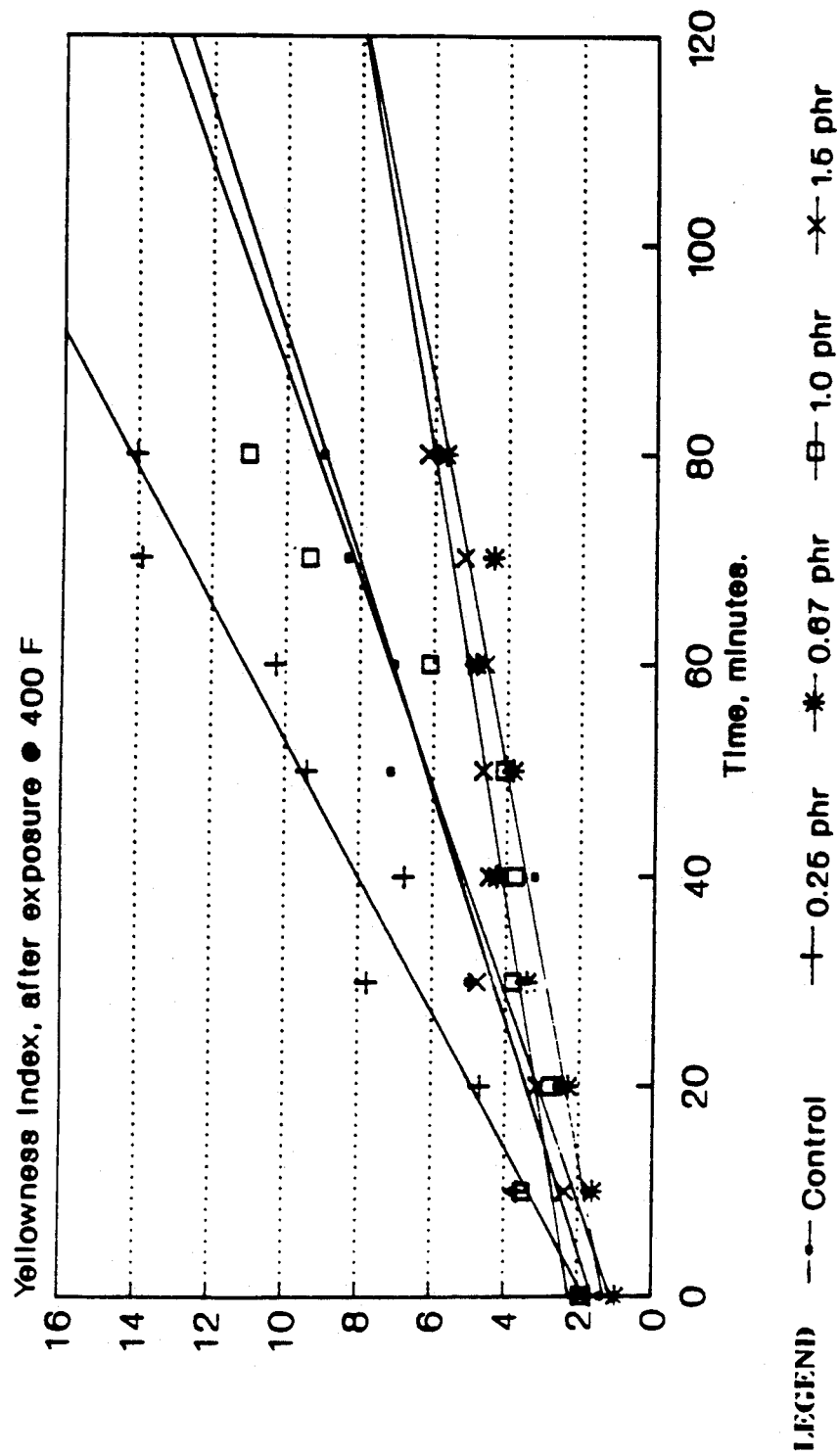
FIG. 1 is a graph of time v. yellowness index values for samples of cellulose acetate formulations containing various amounts of a stabilizer composition in accordance with the present invention after exposure to 400° F. in a conventional oven test.

In accordance with the present invention, a stabilizing system is provided for cellulose esters. Cellulose esters which are stabilized in accordance with this invention are commercial organic cellulose esters of carboxylic acids, such as cellulose acetate, cellulose propionate, cellulose butyrate, cellulose acetate propionate, cellulose acetate butyrate and the like.

In accordance with the present invention, a stabilizing system is provided for such cellulose organic acid esters which comprises nonylphenyl neopentylene phosphite, or stated in terms of systematic nomenclature 5,5-dimethyl-2-nonylphenoxy-1,3,2-dioxaphosphorinane. Preferably the dioxaphosphorinane is used in combination with an epoxidized fatty acid ester compound such as epoxidized linseed oil. The dioxaphosphorinane compound of the present invention may be prepared by reacting neopentyl glycol, a phosphorus source, and nonylphenol according to known procedures.

For instance, 5,5-dimethyl-2-nonylphenoxy-1,3,2-dioxaphosphorinane can be prepared by transesterification of triphenyl phosphite with neopentyl glycol and nonylphenol. Various transesterification procedures can be utilized including those using anhydrous potassium carbonate as catalysts. Alternatively, 5,5-dimethyl-2-nonylphenoxy-1,3,2-dioxaphosphorinane can also be prepared by reaction of phosphorus trichloride, neopentyl glycol and nonylphenol.

The preparation of the dioxaphosphorinane compound of the present invention is further illustrated by the following examples.

EXAMPLE 1

In a two liter round bottom flask were placed 620.56 g (2 moles) of triphenyl phosphite, 430 g (2 moles) of the nonyl phenol, 208.3 g (2 moles) of neopentyl glycol, and 2 g of anhydrous potassium carbonate. The reaction mixture was stirred under a nitrogen blanket and heated to 125°-130°C. and held at such temperature for three hours. Then a vacuum of 10-12 mm Hg was applied and 6 moles of phenol were distilled. The temperature was raised gradually to 175° C. and held there for ½ hour as a small amount of phenol neopentyl glycol phosphite distilled. The pot was then allowed to cool to room temperature either under vacuum or under nitrogen blanket. This procedure yielded 655 g (95%) of product. The reaction product was analyzed by gas chromatography as 78.5% nonylphenyl neopentylene phosphite (NNP), 14.2 nonylphenol, 3.2% phenyl neopentyl glycol phosphite, and 3.5% trineopentylene diphosphite (TNDP). The reaction product was also analyzed by liquid chromatography as 81.2% product, 10.9% nonylphenol, 5 2% phenyl neopentyl glycol phosphite and 2% phenol. The reaction product was determined to have an acid value equal to 0.16. The infra red spectrum of the neat reaction product had characteristic absorption bands at 743.5, 870, 1010, 1056, 1227, 1471.6, 1507.3, 1605 and 2696 reciprocal centimeters.

EXAMPLE 2

The procedure of Example 1 was generally followed but modified to reduce the amount of nonylphenol used by about 10%. This reduction minimizes the amount of residual nonylphenol in the product but slightly increases the amount of phenyl neopentyl glycol phosphite in the product. Phenyl neopentyl glycol phosphite, however, starts to distill at 170° C. at 10mm and can be removed if desired by distilling at a higher temperature or lower pressure. Accordingly, in a 50 liter flask equipped with a thermometer, mechanical stirrer and vacuum distillation apparatus were charged triphenyl phosphite (96%, 19243 g, 59.53 moles), neopentyl glycol (99%, 6262.3 g, 59.53 moles), nonylphenol (11520 g, 52.36 moles), and anhydrous potassium carbonate (100 g). The mixture was stirred under a nitrogen atmosphere and heated to 130° C. over two hours. After three hours at 130° C., a vacuum (10-12 mm) was applied and the phenol distilled off as the pot temperature was slowly raised to 170° C. The pot and distillate were monitored by gas-liquid chromatography (GLC). The process took 3 (8 hour) days. GLC analysis of the pot before the start of distillation detected 15.9% NNP, 29.1 nonylphenol, 24.2% phenyl neopentyl glycol phosphite, and 29.1% phenol. As the phenol was stripped at 10-12 mm Hg from 125° C. to 170° C., the distillate was initially phenol with increasing amounts of phenol neopentyl glycol as the temperature rose. The total distillate was 17944 g (theoretical distillate was calculated to be 17, 577 g including 4% contributed from the triphenyl phosphite). After allowing the product to stand overnight at 25° C., the product was heated with stirring to 70° C. and suction filtered to give a clear pale amber syrupy liquid. The yield was 18,000q (94.3%) with an acid number equal to 0.09. GLC analysis of the reaction product indicated 89.2% NNP, 5.21% phenyl neopentyl glycol phosphite, 3.82% nonyl-phenol and 1.3% TNDP. HPLC analysis of the reaction product indicated 85% NNP, 11.38% phenyl neopentyl glycol phosphite, 2.77% nonylphenol and 0.75% phenol. The IR spectrum of a neat sample showed characteristic absorption bands at 743.5, 870, 1010, 1056, 1227, 1471.6, 1507.3, 1605 and 2696 reciprocal centimeters.

EXAMPLE 3

A procedure similar to that described in U.S. Pat. No. 4,882,374 to produce other dioxaphosphorinane compounds, appropriately modified, has also been found to be useful to provide the dioxaphosphorine compound of the present invention. According to the modified procedure, neopentyl glycol is first dissolved in either xylenes or toluene and phosphorus trichloride while sweeping the reaction flask with nitrogen. Nonylphenol is then added and the toluene is removed by distillation. Preferably the ratio of neopentyl glycol to phosphorus trichloride to nonyl phenol is approximately 1.0:1.0:0.5 to 1.0:1.0:1.0 (it is contemplated that increasing the ratio to 1:1:1 will increase the product yield based on neopentyl glycol and phosphorus trichloride). After additional reaction time, residual neopentyl glycol phosphorochlorodite and any acid phosphite is removed by vacuum stripping at 170° C. and 10 mm. When using toluene as a solvent, the desired product is obtained in greater than 90% yield based on nonylphenol and analyzed by 31P NMR. Similar yields are obtained when xylenes are used as a solvent but the reaction product also contains a small percent of an unknown.

EXAMPLE 3A

In accordance with the foregoing procedure, in a reaction flask phosphorous trichloride (137.35 g, 1.0 mole) was added dropwise over one hour to a solution of neopentyl glycol (104.15 g, 1.0 mole) in 750 ml of toluene at 0° C. while nitrogen was blown through the reaction flask. The reaction mixture was stirred for one hour at 0° to 5° C. and then heated to 90° C. Nonylphenol (110.2 g, 0.5 mole) was added over 15 minutes. The reaction mixture was refluxed for ½ hour and then toluene was distilled from the reaction to an overhead temperature of 110° C. Refluxing was continued for 4 hours while the reaction flask was swept with nitrogen. The remaining toluene and any neopentyl glycol phosphorochlorodite or neopentyl glycol acid phosphite was vacuum stripped at 170° C and 10mm. The material remaining in the reaction flask is the NNP product. The yield was 162.1 g (92%) of a very light yellow viscous liquid: Analysis of the reaction product by 31P NMR (neat, 85% $H_3PO_4$ ext. ref.) showed 99% NNP at 117.7 ppm.

EXAMPLES 3B-3E

The foregoing general procedure was followed substituting xylene for toluene as a solvent and varying the molar ratio of neopentyl glycol (NPG) to phosphorus trichloride ($PCl_3$) to nonylphenol from 1:1:0.5 to 1:1:1. In accordance with this procedure, in a reaction flask, phosphorus trichloride (0.2 mole) was added dropwise at room temperature in 30 minutes to a neopentyl glycol (0.2 mole)/xylene (200 ml) solution while nitrogen was blown into the reaction flask. The mixture was stirred for one hour and then the temperature was raised to 90° C. For each of Examples 3B-E, the respective below noted molar amount of nonylphenol was added in five minutes. The reaction mixture was refluxed at 140° C. for one-half hour and then the solvent was partially stripped. Refluxing was continued for six hours at 140° C. The product Was purified by distillation under vacuum (8–10 mm). Early distillates were 20 ml of remaining xylenes at a pot temperature of 90° C. and later distillates were 8 grams of hydrolyzed components at a pot temperature of 175° C., head temperature of 90°–110° C. The products of Examples 3B-E were analyzed by NMR and GC as follows:

| Example | NPG:$PCl_3$:Nonylphenol Molar Ratio | NNP Yield Percent Based On NPG | Percent Free Nonylphenol By GC | Percent Hydrolyzed Impurities by NMR |
| --- | --- | --- | --- | --- |
| 3B | 1:1:0.5 | 42.70 | — | 0.71 |
| 3C | 1:1:0.8 | 64.83 | 3.3 | 1.03 |
| 3D | 1:1:0.9 | 68.72 | 2.1 | 0.00 |
| 3E | 1:1:1 | 76.74 | 21.6 | 3.40 |

In accordance with the present invention, incorporating stabilizing amounts of 5,5-dimethyl-2-nonylphenoxy-1,3,2-dioxaphosphorinane in a cellulose organic ester composition effectively inhibits polymer degradation which typically results from hot working and/or heating the polymer. In the present invention, it is preferred that the 5,5-dimethyl-2-nonylphenoxy-1,3,2-dioxaphosphorinane is incorporated in the resin composition in an amount of from 0.01 to 1 parts by weight, more preferably from about 0.10 to about 1.0 parts by weight, per 100 parts by weight of cellulose organic acid ester.

Preferably the dioxaphosphorinane of the present invention is used in combination with an epoxidized fatty acid ester compound. Epoxidized fatty acid ester compounds include epoxidized short chain fatty acid esters, particularly short chain alkyl esters of fatty acids such as butyl epoxy stearate and the like; and various epoxidized long chain fatty acid triglycerides and the like, including epoxidized vegetable and other natural oils such as epoxidized soy bean oil and epoxidized linseed oil. Most preferably, the dioxaphosphorinane is used in combination with epoxidized linseed oil.

The epoxidized fatty acid compound can generally be used in an amount of 0.005 to 3.0 parts by weight, more preferably from 0.05 to 2 parts by weight, per 100 parts of the cellulose organic acid ester. Preferred stabilizing compositions have been formulated wherein the ratio of the 5,5-dimethyl-2-nonylphenoxy-1,3,2-dioxaphosphorinane to epoxidized linseed oil is approximately 2:1 by weight; with about 0.67 parts of such phosphite/epoxy composition per 100 parts of cellulose acetate resin, about 1.00 parts of such phosphite/epoxy composition per 100 parts of cellulose acetate propionate resin, and about 1.0 to 1.25 parts of such phosphite/epoxy composition per 100 parts of cellulose acetate butyrate resin being most preferred. Blends of the nonylphenyl neopentylene phosphite/epoxidized linseed oil compositions of the present invention also exhibit lower volatility and improved shelf stability, i.e. better hydrolytic stability compared to the unblended components and compared to other phosphite stabilizers.

The phosphite stabilizer compositions of the present invention may be incorporated into the cellulose organic acid ester materials by conventional blending techniques. For example, the stabilizer composition may be added directly to a melt of the polymer on a roll mill to distribute the phosphite compound uniformly throughout the polymer. Alternatively, the phosphite composition may be blended with the cellulose organic ester material and then the mixture can be mixed further in and extruded from an extruder.

Additional compatible stabilizers and additives may also be incorporated in the cellulose ester compositions of the present invention. For instance, the stabilized cellulose ester compositions can contain conventional plasticizers, pigments, colorants and the like. Fluorescent cellulose ester compositions can, in addition to the phosphite stabilizer compositions of the present invention, include a fluorescent pigment stabilizer. In this latter regard, it has separately been found that sodium perchlorate compositions can be used to stabilize certain fluorescent pigmented resins.

The following examples illustrate the use of the compositions of the present invention.

EXAMPLES 4-8

One hundred parts of cellulose acetate resin, 39 parts of plasticizer, 0.4 parts of phenolic antioxidant, 0.02 parts of metal salt acid acceptor and the amount of stabilizers listed below were dry blended on a Hobart Mixer and then milled on a two roll mill at 300° F. To determine the preferred stabilizing effective dose of compositions of the present invention, the formulated products of Examples 4-8 were subjected to a conventional oven test wherein the product was heated in an oven at 400° F. and samples of the product were withdrawn at 10 minute intervals over an 80 minute period. Additionally, the formulated product of Examples 4-8 were heated in an Metrostat oven at 204° C. and samples of the product Were ejected from the Oven over a 100 minute period. The timed conventional oven and Metrostat oven samples were analyzed to determine their respective yellowness index value.

| Example No. | Stabilizer Composition |
| --- | --- |
| 4 | None |
| 5 | 0.25 parts per hundred parts of resin of a composition consisting of about 0.17 parts of 5,5-dimethyl-2-nonylphenoxy-1,3,2-dioxaphosphorinane per 100 parts of resin and about 0.08 parts of epoxidized linseed oil per 100 parts of resin |
| 6 | 0.67 parts per hundred parts of resin of a composition consisting of about 0.45 parts of 5,5-dimethyl-2-nonylphenoxy-1,3,2-dioxaphosphorinane per 100 parts of resin and about 0.22 parts of epoxidized linseed oil per 100 parts of resin |
| 7 | 1.00 parts per hundred parts of resin of a composition consisting of about 0.67 parts of 5,5-dimethyl-2-nonylphenoxy-1,3,2-dioxaphosphorinane per 100 parts of resin and about 0.33 parts of epoxidized linseed oil per 100 parts of resin |
| 8 | 1.50 parts per hundred parts of resin of a composition consisting of about 1.00 parts of 5,5-dimethyl-2-nonylphenoxy-1,3,2-dioxaphosphorinane per 100 parts of resin and about 0.50 parts of epoxidized linseed oil per 100 parts of resin |

Figure 2:
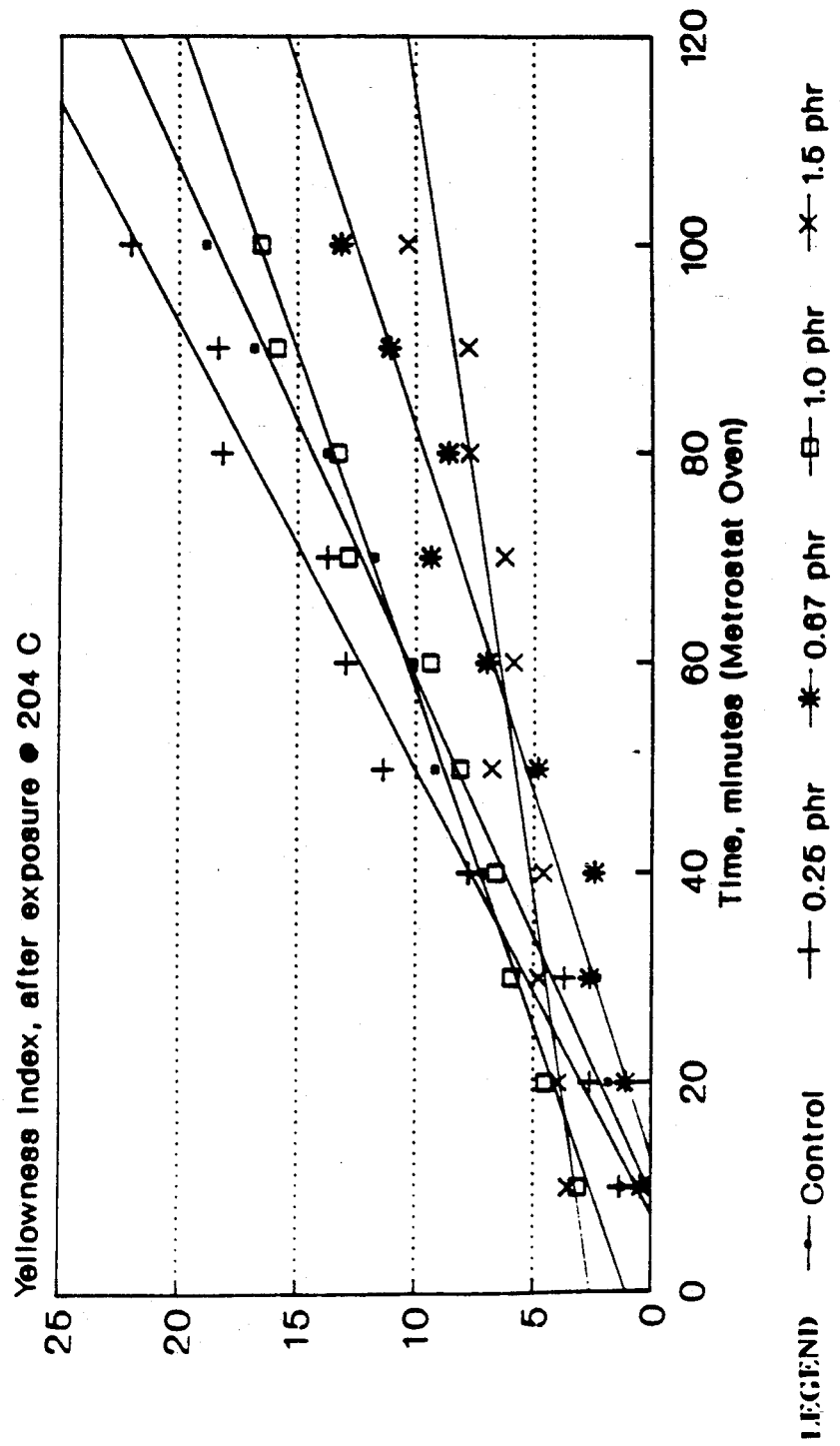
FIG. 2 is a graph of time v. yellowness index values for samples of cellulose acetate formulations containing various amounts of a stabilizer composition in accordance with the present invention after exposure to 204° C. in a Metrostat oven test.

The conventional oven test and Metrostat oven test yellow index results for Examples 4-8 are, respectively, graphically depicted in FIGS. 1 and 2. These results were reviewed for stabilizer performance in view of parts total stabilizer composition included in the formulation. Based upon such review, the formulation of Example 6 containing 0.67 phr total stabilizer appeared to provide a preferred formulation.

In addition to evaluating the formulation of Example 6 by respective Yellowness Index values over time in conventional oven tests and Metrostat oven tests, the formulation of Example 6 was also evaluated by its respective melt flow index (ASTM D 1238, Condition E) at 190° C., g over a twenty minute period. Table 1 summarizes the conventional oven test Yellow Index values for Examples 4 and 6, Table 2 summarizes the Metrostat oven test Yellow Index values for Examples 4 to 6, and Table 3 summarizes the melt flow index test results for Example 6.

TABLE 1

| Stabilizer System | Yellowness Index at 400° F., Std. Oven | | | | | | | | |
| --- | --- | --- | --- | --- | --- | --- | --- | --- | --- |
| Time (min) | 0 | 10 | 20 | 30 | 40 | 50 | 60 | 70 | 80 |
| Example 4 | 1.4 | 3.8 | 2.6 | 5.0 | 3.2 | 7.1 | 7.0 | 8.3 | 9.0 |
| Example 6 | 1.0 | 1.6 | 2.3 | 3.4 | 4.3 | 3.8 | 4.8 | 4.4 | 5.7 |

TABLE 2

| Stabilizer System | Yellowness Index at 204° C., Metrostat Oven | | | | | | | | | |
| --- | --- | --- | --- | --- | --- | --- | --- | --- | --- | --- |
| Time (min) | 10 | 20 | 30 | 40 | 50 | 60 | 70 | 80 | 90 | 100 |
| Example 4 | 1.3 | 1.8 | 2.2 | 7.0 | 9.1 | 10.0 | 11.7 | 13.6 | 16.7 | 18.7 |
| Example 6 | 0.4 | 1.1 | 2.6 | 2.4 | 4.8 | 7.0 | 9.4 | 8.6 | 11.1 | 13.1 |

TABLE 3

| Stabilizer System | Melt Flow Index at 190° C., g per 10 min | | |
| --- | --- | --- | --- |
| Time (min) | 6 | 12 | 20 |
| Example 6 | 8.2 | 8.4 | 13.2 |

EXAMPLES 9-13

One hundred parts of cellulose acetate propionate resin, 14 parts of plasticizer, 0.02 parts of metal salt acid acceptor and the amount of stabilizers listed below were dry blended on a Hobart Mixer and then milled on a two roll mill at 300° F. To determine the preferred stabilizing effective dose of compositions of the present invention, the formulated products of Examples 9-13 were subjected to a conventional oven test wherein the product was heated in an oven at 400° F. and samples of the product were withdrawn at 10 minute intervals over an 80 minute period. The timed conventional oven samples were analyzed to determine their respective yellowness index value.

| Example No. | Stabilizer Composition |
| --- | --- |
| 9 | None |
| 10 | 0.25 parts per hundred parts of resin of a composition consisting of about 0.17 parts of 5,5-dimethyl-2-nonylphenoxy-1,3,2-dioxaphosphorinane per 100 parts of resin and about 0.08 parts of epoxidized linseed oil per 100 parts of resin |
| 11 | 0.67 parts per hundred parts of resin of a composition consisting of about 0.45 parts of 5,5-dimethyl-2-nonylphenoxy-1,3,2-dioxaphosphorinane per 100 parts of resin and about 0.22 parts of epoxidized linseed oil per 100 parts of resin |
| 12 | 1.00 parts per hundred parts of resin of a composition consisting of about 0.67 parts of 5,5-dimethyl-2-nonylphenoxy-1,3,2-dioxaphosphorinane per 100 parts of resin and about 0.33 parts of epoxidized linseed oil per 100 parts of resin |
| 13 | 1.25 parts per hundred parts of resin of a composition consisting of about 0.83 parts of 5,5-dimethyl-2-nonylphenoxy-1,3,2-dioxaphosphorinane per 100 parts of resin and about 0.42 parts of epoxidized linseed oil per 100 parts of resin |

Figure 3:
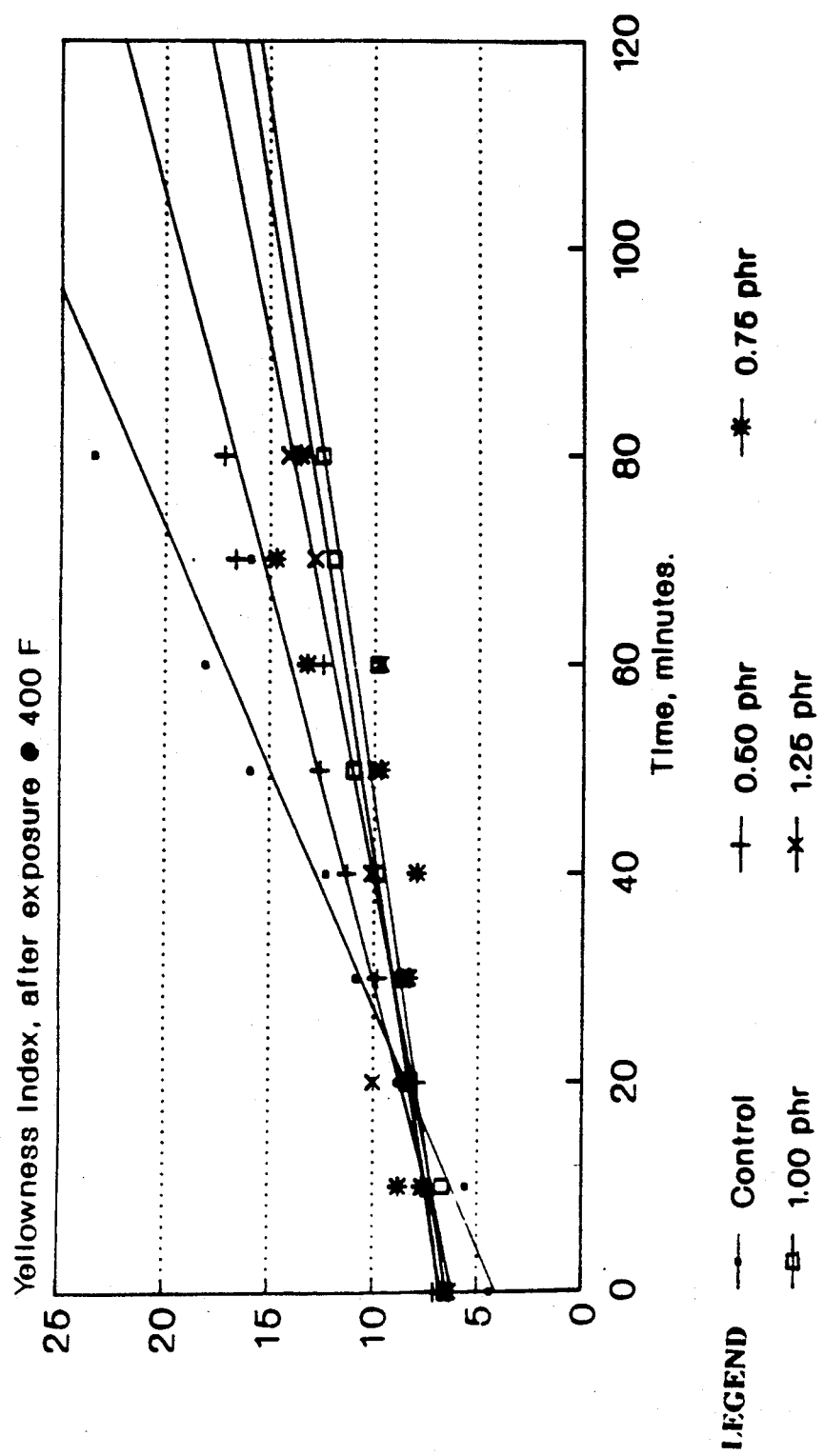
FIG. 3 is a graph of time v. yellowness index values for samples of cellulose acetate propionate formulations containing various amounts of a stabilizer composition in accordance with the present invention after exposure to 400° F. in a conventional oven test.

The conventional oven test yellow index results for Examples 9-12 are graphically depicted in FIG. 3. These results were reviewed for stabilizer performance in view of parts total stabilizer composition included in the formulation. Based upon such review, the formulations of Examples 12 and 13 containing 1.00 phr and 1.25 respective total stabilizer appeared to provide preferred formulations.

In addition to evaluating the formulations of Examples 12 and 13 by their respective Yellowness Index values over time in conventional oven tests, the formulations of Examples 12 and 13 were also evaluated by their respective melt flow index at 190° C. over a twenty minute period. Table 4 summarizes the Yellow Index values for Examples 9, 12 and 13 and Table 5 summarizes the melt flow index results for Examples 12 and 13.

TABLE 4

| Stabilizer System | Yellowness Index at 400° F., Std. Oven | | | | | | | | |
| --- | --- | --- | --- | --- | --- | --- | --- | --- | --- |
| Time (min) | 0 | 10 | 20 | 30 | 40 | 50 | 60 | 70 | 80 |
| Example 9 | 4.4 | 5.5 | 8.7 | 10.6 | 12.0 | 15.6 | 17.7 | 15.6 | 23.0 |
| Example 12 | 6.5 | 6.7 | 8.4 | 8.5 | 9.8 | 11.0 | 9.8 | 11.9 | 12.5 |

TABLE 4-continued

| Stabilizer System Time (min) | Yellowness Index at 400° F., Std. Oven | | | | | | | | |
|---|---|---|---|---|---|---|---|---|---|
| | 0 | 10 | 20 | 30 | 40 | 50 | 60 | 70 | 80 |
| Example 13 | 6.4 | 7.6 | 10.0 | 8.5 | 10.1 | 9.9 | 9.7 | 12.8 | 14.1 |

TABLE 5

| Stabilitzer System Time (min) | Melt Flow Index at 190° C., g per 10 min | | |
|---|---|---|---|
| | 6 | 12 | 20 |
| Example 12 | 17.6 | 36.8 | >40.0 |
| Example 13 | 18.7 | 34.8 | >40.0 | the formulation. Based upon such review, the formulations of Examples 19 and 20 containing 1.00 phr and 1.25 respective total stabilizer appeared to provide preferred formulations.

In addition to evaluating the formulations of Examples 17 and 18 by their respective Yellowness Index values over time in conventional oven tests, the formulations of Examples 17 and 18 were also evaluated by their respective melt flow index at 190° C., g over a twenty minute period. Table 6 summarizes the Yellow Index values for Examples 14, 17 and 18 and Table 7 summarizes the melt flow index results for Examples 17 and 18.

TABLE 6

| Stabilizer System Time (min) | Yellowness Index at 400° F., Std. Oven | | | | | | | | |
|---|---|---|---|---|---|---|---|---|---|
| | 0 | 10 | 20 | 30 | 40 | 50 | 60 | 70 | 80 |
| Example 14 | 6.3 | 10.4 | 15.4 | 18.3 | 20.2 | 22.1 | 23.5 | 24.8 | 24.4 |
| Example 17 | 4.4 | 6.4 | 7.4 | 9.9 | 13.2 | 14.8 | 15.2 | 13.7 | 16.9 |
| Example 18 | 3.3 | 6.0 | 6.5 | 6.9 | 9.0 | 11.4 | 13.1 | 15.1 | 14.9 |

EXAMPLES 14–18

One hundred parts of cellulose acetate butyrate resin, 8.5 parts of plasticizer, 0.02 parts of metal salt acid acceptor and the amount of stabilizers listed below were dry blended on a Hobart Mixer and then milled on a two roll mill at 300° F. To determine the rpeferred stabilizing effective dose of compositions of the present invention, the formulated products of Examples 16–20 were subjected to a conventional oven test wherein the product was heated in an oven at 400° F. and samples of the product were withdrawn at 10 minute intervals over an 80 minute period. The timed conventional oven samples were analyzed to determine their respective yellowness index value.

| Example No. | Stabilizer Composition |
|---|---|
| 14 | None |
| 15 | 0.25 parts per hundred parts of resin of a composition consisting of about 0.17 parts of 5,5-dimethyl-2-nonylphenoxy-1,3,2-dioxaphosphorinane per 100 parts of resin and about 0.08 parts of epoxidized linseed oil per 100 parts of resin |
| 16 | 0.67 parts per hundred parts of resin of a composition consisting of about 0.45 parts of 5,5-dimethyl-2-nonylphenoxy-1,3,2-dioxaphosphorinane per 100 parts of resin and about 0.22 parts of epoxidized linseed oil per 100 parts of resin |
| 17 | 1.00 parts per hundred parts of resin of a composition consisting of about 0.67 parts of 5,5-dimethyl-2-nonylphenoxy-1,3,2-dioxaphosphorinane per 100 parts of resin and about 0.33 parts of epoxidized linseed oil per 100 parts of resin |
| 18 | 1.25 parts per hundred parts of resin of a composition consisting of about 0.83 parts of 5,5-dimethyl-2-nonylphenoxy-1,3,2-dioxaphosphorinane per 100 parts of resin and about 0.42 parts of epoxidized linseed oil per 100 parts of resin |

Figure 4:
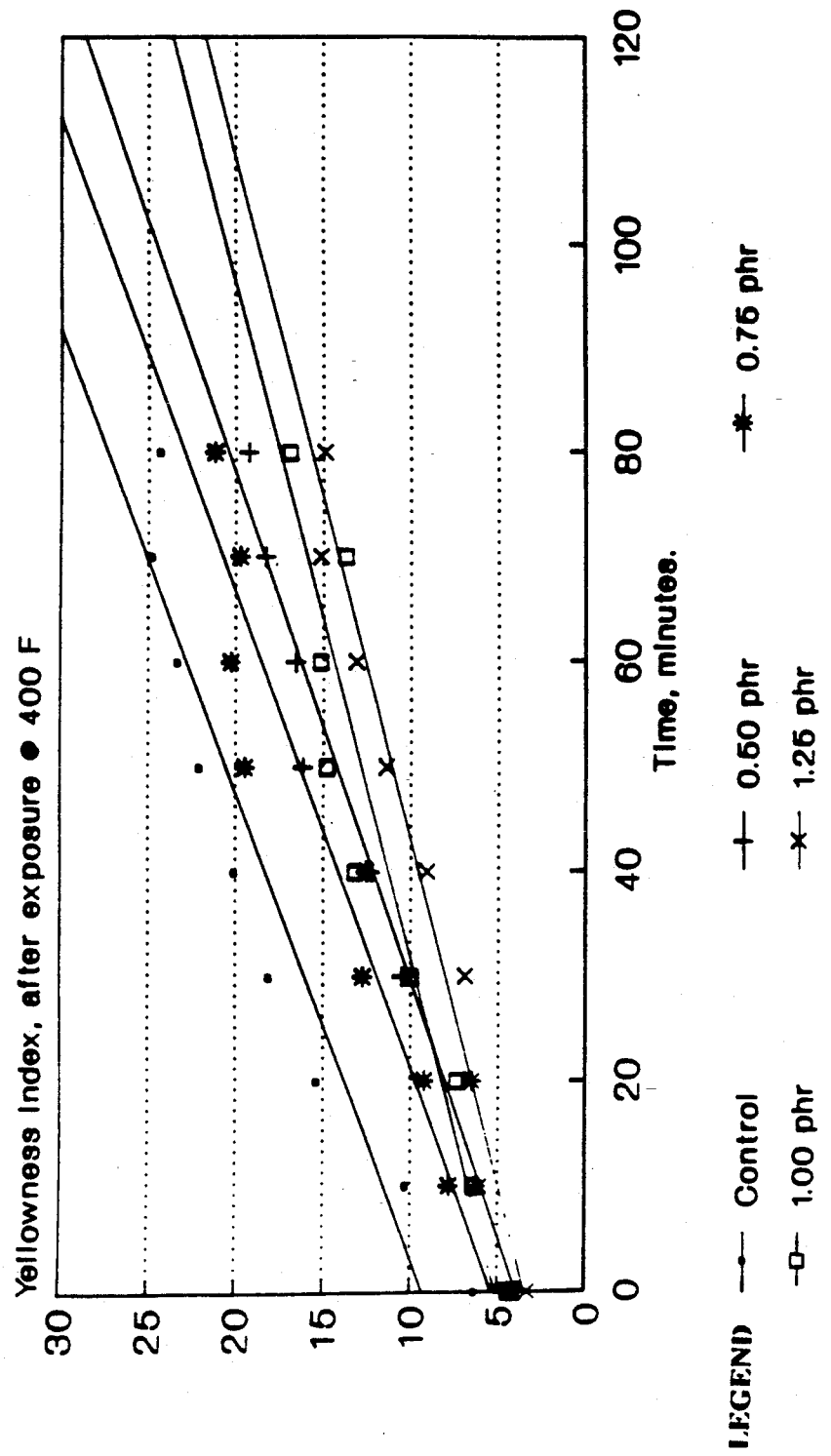
FIG. 4 is a graph of time v. yellowness index values for samples of cellulose acetate butyrate formulations containing various amounts of a stabilizer composition in accordance with the present invention after exposure to 400° F. in a conventional oven test.

The conventional oven test yellow index results for Examples 16–20 are graphically depicted in FIG. 4. These results were reviewed for stabilizer performance in view of parts total stabilizer composition included in

TABLE 7

| Stabilizer System Time (min) | Melt Flow Index at 190° C., g per 10 min | | |
|---|---|---|---|
| | 6 | 12 | 20 |
| Example 17 | 5.3 | 5.8 | 8.7 |
| Example 18 | 7.0 | 7.4 | 13.2 |

The foregoing examples demonstrate that 5,5-dimethyl-2-nonylphenoxy-1,3,2-dioxaphosphorinane and epoxidized linseed oil when incorporated into cellulose carboxylic acid ester resins effectively stabilize the resin from the degrading effects of heat and processing.

What is claimed is:

1. A stabilized composition comprising a cellulose carboxylic acid ester plastic composition susceptible to degradation during processing or upon exposure to heat containing a stabilizing amount of 5,5-dimethyl-2-nonylphenoxy-1,3,2-dioxaphosphorinane.

2. A stabilized composition according to claim 1 wherein said cellulose carboxylic acid ester is selected from the group consisting of cellulose acetate, cellulose acetate-propionate, and cellulose acetate-butyrate cellulose esters.

3. A stabilized composition according to claim 1 wherein said dioxaphosphorinane is present in an amount of about 0.10 to about 1.0 parts by weight relative to 100 parts by weight of cellulose ester present.

4. A stabilized composition according to claim 1 which further comprises an epoxy fatty acid ester compound.

5. A stabilized composition according to claim 4 wherein said epoxy compound is epoxidized linseed oil.

6. A stabilized composition according to claim 5 wherein the ratio of said dioxaphosphorinane to said epoxidized linseed oil is approximately 2:1 by weight.

7. A method of stabilizing a cellulose ester plastic composition susceptible to degradation during processing comprising mixing a cellulose resin and a stabilizing amount of a stabilizer composition comprising 5,5- dimethyl-2-nonylphenoxy-1,3,2-dioxaphosphorinane.

8. The method of claim 7 wherein said stabilizer composition further comprises an epoxy fatty acid ester compound.

9. The method of claim 8 wherein said epoxy compound is epoxidized linseed oil.

10. The method of claim 7 wherein said dioxaphosphorinane is present in an amount of about 0.10 to about 1.0 parts by weight relative to 100 parts by weight of said cellulose ester.

11. The method of claim 9 wherein the ratio of said dioxaphosphorinane to said epoxy compound is about 2:1 by weight and said dioxaphosphorinane is present in an amount of about 0.10 to about 1.0 parts by weight relative to 100 parts by weight of said cellulose ester.

12. The method of claim 11 wherein said cellulose carboxylic acid ester plastic composition is cellulose acetate, said dioxaphosphorinane is present in an amount of about 0.45 parts per 100 parts of said resin and said epoxy compound is present in an amount of about 0.22 parts per 100 parts of said resin.

13. The method of claim 11 wherein said cellulose carboxylic acid ester plastic composition is cellulose acetate propionate, said dioxaphosphorinane is present in an amount of about 0.67 parts per 100 parts of said resin and said epoxy compound is present in an amount of about 0.33 parts per 100 parts of said resin.

14. The method of claim 11 wherein said cellulose carboxylic acid ester plastic composition is cellulose acetate butyrate, said dioxaphosphorinane is present in an amount of from about 0.65 parts to about 0.85 parts per 100 parts of said resin and said epoxy compound is present in an amount of from about 0.33 parts to about 0.45 parts per 100 parts of said resin.

15. A composition of matter comprising 5,5-dimethyl-2-nonlphenoxy-1,3,2- dioxaphosphorinane.

16. The composition of claim 15 which further comprises an epoxy fatty acid ester compound.

17. The composition of claim 16 wherein said epoxy fatty acid ester compound is epoxidized linseed oil.

18. The composition of claim 17 wherein the ratio of said dioxaphosphorinane to said epoxy compound is about 2:1 by weight.

* * * * *